United States Patent Office 3,437,455
Patented Apr. 8, 1969

3,437,455
AZIDO DERIVATIVES OF PHOSPHOROUS THIOACIDS AND METHOD FOR THEIR PREPARATION
Herbert W. Roesky, Gottingen, Germany, assignor to E. I. du Pont de Nemours and Company, Wilmington, Del., a corporation of Delaware
No Drawing. Filed Aug. 3, 1966, Ser. No. 569,831
Int. Cl. C01b 21/54; C07c 117/00
U.S. Cl. 23—357
12 Claims

ABSTRACT OF THE DISCLOSURE

Products having one of the formulas:

(I) 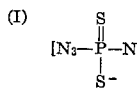   and   (II) 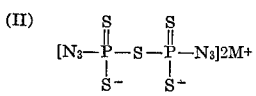

wherein M is hydrogen, an alkali metal cation the ammonium cation $NH_4^+$, or an onium cation, $R_4Y^+$ in which Y is nitrogen or phosphorus, and R is a 1–6 carbon hydrocarbon radical free of aliphatic unsaturation are prepared substantially from alkali metal azides and phosphorus pentasulfide. These products find use as reducing agents and as analytical reagents in the gravimetric determination of certain cations or the removal of the latter from solution.

---

This invention relates to novel compounds, more particularly to azido derivatives of phosphorus thioacids, and to a method of preparing them.

The products of this invention have one of the formulas (I) 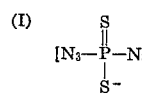   and   (II) 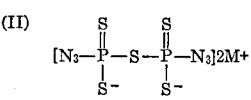

in which M is hydrogen, an alkali metal cation, the ammonium cation $NH_4^+$, or an onium cation $R_4Y^+$, where Y is nitrogen or phosphorus and R is a 1–6 carbon hydrocarbon radical free of aliphatic unsaturation.

The products of Formula I can be viewed as derivatives of phosphorodithioic acid,

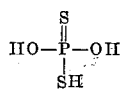

and those of Formula II as derivatives of phosphonodithioic acid

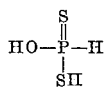

[For the nomenclature of phosphorus acid derivatives, see Chem. Eng. News 30, 4515–4522 (1952).] In formula I the anion shown in brackets is therefore the diazidophosphorodithioate anion, and in Formula II it is the P,P'-thiobis(azidophosphonodithioate anion).

The salts of Formulas I and II where M is an alkali metal cation are prepared by reacting an alkali metal azide with phosphorus pentasulfide in a mole ratio of the first reactant to the second of at least 4:1 at a temperature in the range of 15 to 100° C. The type of azido product formed in this reaction is primarily a function of the reaction medium. The products of Formula I, i.e., the alkali metal diazidophosphorodithioates, are formed when the reaction medium is acetonitrile, the initial reaction being followed by treatment of the acetonitrile-soluble reaction product with water. The products of Formula II, i.e., the alkali metal P,P'-thiobis(azidophosphonodithioates), are formed when the reaction is conducted in water.

The salts of Formulas I and II where M is an onium cation are obtained from the corresponding alkali metal salts by metathetical reaction in an aqueous medium with the appropriate onium halide $R_4Y^+X^-$ where X is a halide ion and R and Y are as previously defined.

The free acids (M=H) are obtained in a cation-exchange reaction by contacting an aqueous or organic solvent solution of a quaternary ammonium or phosphonium salt with an ion-exchange resin in its hydrogen (acidic) form.

The ammonium salts (M=$NH_4$) can be obtained by treating the free acids in solution with aqueous ammonia.

Whenever molar quantities of phosphorus pentasulfide are mentioned, it is to be understood that they refer to $P_4S_{10}$, the accepted formula for this compound, rather than to the older formula $P_2S_5$.

The azide reactant can be any alkali metal azide, sodium and potassium azide being preferred. When salts of the anion of Formula I are desired, the reaction medium is, as already stated, acetonitrile; the molar ratio of the reactants is at least 4:1, preferably between 6:1 and 15:1; and the reaction temperature is preferably in the range of 50 to 100° C., in which case the reaction is rapid, being substantially complete within one hour or less. However, the reaction temperature can be as low as 15–20° C. if a slower reaction rate is not objectionable. The product is isolated by filtering the reaction mixture to separate the unchanged reactants and insoluble coproducts, evaporating the filtrate and treating the residue with water at ordinary or slightly elevated temperature. The resulting aqueous solution contains the salt of the diazidophosphorodithioate anion with the cation of the azide reactant.

When salts of the anion of Formula II are desired, the reaction medium is water; the molar ratio of the reactants is at least 4:1, preferably between 8:1 and 15:1; and the temperature is preferably between 20 and 50° C., although higher temperatures can be used for short periods of time. A reaction time from a few minutes to 0.5 hour is sufficient. The mixture is then filtered. The filtrate contains the salt of the P,P'-thiobis(azidophosphonodithioate anion) with the cation of the azide reactant.

The alkali metal salts of Formulas I and II can be isolated if desired, for example, by evaporation of their aqueous solutions under reduced pressure. Preferably, they are converted to the more readily purifiable, easier to handle quaternary ammonium or phosphonium salts. This is done simply by treating the aqueous solution of the alkali metal diazidophosphorodithioate or P,P'-thiobis(azidophosphonodithiote) with at least a molar equivalent, preferably an excess, of a tetrahyldrocarbylammonium- or tetrahydrocarbylphosphonium halide (chloride, bromide, or iodide). The quaternary onium salt resulting from the metathetical reaction precipitates from the aqueous solution. It is collected by filtration and purified, if necessary, by crystallization from an appropriate solvent.

Diazidophosphorodithioic acid and P,P'-thiobis(azidophosphonodithioic acid) can be prepared by bringing a solution of one of their quaternary onium salts in an aqueous or organic solvent in contact with one of the commercially available polymeric ion-exchange resins in its hydrogen form, i.e., containing a plurality of sulfonic or carboxyl groups. An exchange of cations takes place and the free phosphorus thioacid forms in solution in the solvent employed.

Treatment of the free acid in solution either in water or in a water-miscible solvent with an excess of aqueous ammonia, followed if necessary by partial or complete evaporation of the solvent, affords the corresponding ammonium salt.

The following examples illustrate the invention.

EXAMPLE 1

To a solution of 5.0 g. (0.077 mole) of sodium azide in 60 ml. of water was added 3.0 g. (0.0067 mole) of phosphorus pentasulfide. The mixture was stirred rapidly at room temperature for 20 minutes, during which time hydrogen sulfide and hydrazoic acid were formed, then filtered, and the filtrate was diluted with 20 ml. of water.

To this solution, which contained sodium P,P'-thiobis-(azidophosphonodithioate), was added an excess of tetrapropylammonium bromide in aqueous solution. A white solid precipitated immediately. This solid was collected by filtration, dried under reduced pressure and recrystallized from a water-methanol mixture. This product (M.P. 157° C., dec.) was tetrapropylammonium P,P'-thiobis(azidophosphonodithioate),

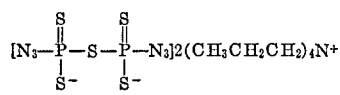

as shown by elemental analysis and by its infrared spectrum which showed strong azide bands.

*Analysis.*—Calcd. for $C_{24}H_{56}N_8P_2S_5$: C, 42.48; H, 8.25; N, 16.52; P, 9.14; S, 23.59. Found: C, 42.47; H, 8.69; N, 15.90; P, 9.45; S, 24.25.

Potassium P,P'-thiobis(azidophosphonodithioate) can be prepared in the same manner, starting with potassium azide. Replacing tetrapropylammonium bromide in the second step of the operation by other quaternary ammonium or phosphonium halides such as trimethylethylammonium iodide, tetra-n-hexylammonium bromide, diethyldiphenylammonium iodide or tetraethylphosphonium bromide affords the corresponding salts of the P,P'-thiobis-(azidophosphonodithioate anion).

EXAMPLE 2

A rapidly stirred mixture of 4.4 g. (0.01 mole) of phosphorus pentasulfide and 3.9 g. (0.06 mole) of sodium azide in 50 ml. of acetonitrile was heated at 85° C. for about 0.5 hour. The mixture was then filtered under nitrogen and the filtrate was evaporated to dryness under reduced pressure. The residual, slightly yellow solid was dissolved in water. Formation of hydrogen sulfide and hydrazoic acid was noted.

To this solution, which contained sodium diazidophosphorodithioate, was added an excess of tetrapropylammonium iodide. A white solid precipitated, which was collected by filtration, recrystallized from a water-methanol mixture and dried at room temperature under reduced pressure. There was obtained 1.8 g. of tetrapropylammonium diazidophosphorodithioate.

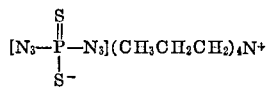

as a solid melting at 66–67° C. without decomposition.

*Analysis.*—Calcd. for $C_{12}H_{28}N_7PS_2$: C, 39.42; H, 7.67; N, 28.62; P, 8.5; S, 17.55. Found: C, 39.85; H, 7.81; N, 26.85; P, 8.61; S, 19.27.

In another preparation under essentially the same conditions, the reaction product, after several recrystallizations from water-methanol, was obtained in a purer form as white crystals melting at 75–77° C. (Found: C, 39.53; H, 7.81; N, 26.61; P, 8.58; S, 17.67.

Potassium diazidophosphorodithioate can be prepared in the same manner, using potassium azide instead of sodium azide. Replacing tetrapropylammonium bromide in the second step of the operation by other quaternary ammonium halides such as tetra-n-butylammonium chloride, triethylmethylammonium bromide or triphenylmethylammonium bromide affords the corresponding salts of the diazidophosphorodithioate anion.

EXAMPLE 3

An aqueous solution of sodium diazidophosphorodithioate, obtained as described in Example 2, was treated with methyltriphenylphosphonium chloride. A white solid precipitated which was recovered by filtration. This solid was dissolved in methanol, the solution was treated with absorbent carbon, warmed for 5 minutes and filtered. On cooling the filtrate, methyltriphenylphosphonium diazidophosphorodithioate,

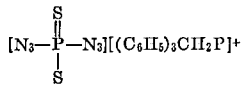

was obtained as white crystals, M.P. 75–77 C.

*Analysis.*—Calcd. for $C_{19}H_{18}N_6P_2S_2$: C, 50.0; H, 3.95; N, 18.42; P, 13.60; S, 14.05. Found: C, 49.66; H, 4.12; N, 17.81; P, 13.37; S, 14.51.

Replacing methyltriphenylphosphonium bromide in this reaction by other quaternary phosphonium halides such as tetramethylphosphonium iodide or tetra-n-butylphosphonium bromide affords the corresponding salts of the diazidophosphorodithioate anion.

EXAMPLE 4

A solution of 3 g. of tetrapropylammonium diazidophosphorodithioate in a mixture of 100 ml. of methanol and 10 ml. of water was passed through a column of a commercial sulfonated polystyrene copolymer cation-exchange resin (hydrogen form) filling a tube 70 cm. long and 2.5 cm. inside diameter. The column was then washed by passing 150 ml. of methanol-water through the tube. The eluate contained diazidophosphorodithioic acid, as shown by its infrared spectrum. Addition of tetrapropylammonium bromide to this solution followed by evaporation of part of the solvent gave the tetrapropylammonium salt of the acid, identical to the product of Example 2. The titration curve showed that diazidophosphorodithioic acid is a strong acid.

Instead of using the tetrapropylammonium salt in the above-described cation-exchange reaction, other quaternary ammonium or phosphonium salts can be used, such as the tetra-n-amylammonium or the tetrapropylphosphonium salts. The same procedure affords P,P'-thiobis (azidophosphonodithioic acid) when applied to, for example, tetramethylammonium or tetrapropylammonium P,P'-thiobis(azidophosphonodithioate).

Other solvents can be used in this cation-exchange reaction, such as water if the initial salt is sufficiently water-soluble, or acetonitrile.

Ammonium diazidophosphorodithioate and ammonium P,P'-thiobis(azidophosphonodithioate) are obtained by treating solutions of the free acids, obtained as above, with an excess of aqueous ammonia and evaporating the solvent under reduced pressure.

The products of this invention precipitate large cations (e.g., $Cr^{II}$, $Mn^{II}$, $Pd^{II}$, $Pt^{II}$, $Hg^{I}$, $Hg^{II}$, $Th^{IV}$, $U^{IV}$, etc.) from aqueous solutions of salts of these cations. Thus, they are useful in the analytical determination of such cations by gravimetric methods, or in their removal from aqueous solutions when this is desired.

Further, the products of this invention are strong reducing agents. For example, they rapidly reduce potassium permanganate in aqueous solution. Thus, they are useful as analytical reagents in the determination of the oxidizing strength of various oxidizing agents.

For applications of the type mentioned above, the products of this invention can be used in aqueous solution when they are sufficiently soluble in water, or in solution in water-miscible organic solvents such as methanol or acetonitrile.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the class consisting of

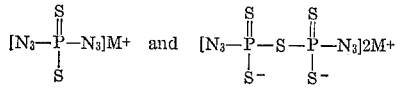

in which M is a member of the group consisting of hydrogen, alkali metal cations, the ammonium cation $NH_4^+$, and onium cations of the formula $R_4Y^+$, where Y is nitrogen or phosphorus and R is a 1–6 carbon hydrocarbon radical free of aliphatic unsaturation.

2. Compounds of claim 1 wherein M is hydrogen.

3. Tetrapropylammonium P,P' - thiobis(azidophosphonodithioate), the compound of the second formula of claim 1 wherein $M^+$ is $(CH_3CH_2CH_2)_4N^+$.

4. Tetrapropylammonium diazidophosphorodithioate, the compound of the first formula of claim 1 wherein $M^+$ is $(CH_3CH_2CH_2)_4N^+$.

5. Methyltriphenylphosphonium diazidophosphorodithioate, the compound of the first formula of claim 1 wherein $M^+$ is $[(C_6H_5)_3CH_3P]^+$.

6. Diazidophosphorodithioic acid, the compound of Formula 1 of claim 1 wherein M is hydrogen.

7. Process for preparing compounds of claim 1 wherein M is an alkali metal cation which comprises reacting an alkali metal azide with phosphorus pentasulfide in a mole ratio of the first reactant to the second of at least 4:1 at a temperature in the range of 15 to 100° C. and in a reaction medium selected from the class consisting of acetonitrile and water.

8. Process of claim 7 in which the reaction medium is acetonitrile, the initial reaction being followed by treatment of the acetonitrile-soluble reaction product with water, to yield alkali metal diazidophosphorodithioates.

9. Process of claim 7 in which the reaction is conducted in water, whereupon alkali metal P,P'-thiobis(azidophosphonodithioates) are formed.

10. Process of preparing compounds of claim 1 wherein M is an onium cation which comprises reacting metathetically in an aqueous medium a salt of claim 1 in which M is an alkali metal cation with an onium halide of the formula $R_4Y^+X^-$ wherein X is a halide ion and R and Y are as defined in claim 1.

11. Process for preparing compounds of claim 1 wherein M is hydrogen which comprises contacting an aqueous or organic solvent solution of a quaternary ammonium or phosphonium salt of claim 1 with an ion-exchange resin in its hydrogen form.

12. Process for preparing compounds of claim 1 wherein M is ammonium which comprises treating the compounds of claim 1 in which M is H in solution with aqueous ammonia.

References Cited

UNITED STATES PATENTS 2,830,029  4/1958  Adams.
2,649,464  8/1953  Hartley et al.

EARL C. THOMAS, *Primary Examiner.*

H. S. MILLER, *Assistant Examiner.*

U.S. Cl. X.R.

260—349